United States Patent [19]

Alexandrov et al.

[11] Patent Number: 4,605,247
[45] Date of Patent: Aug. 12, 1986

[54] DEVICE FOR SEALING THE DETACHABLE JOINTS OF TUBING ELEMENTS IN PNEUMATIC TRANSPORT FACILITIES

[75] Inventors: Adolf M. Alexandrov, Moscow; Evgeny F. Bulginov, Moskovskaya; Jury A. Yashin, Moscow; Vladimir Y. Tsernes, Moscow; Igor I. Volyansky, Moscow, all of U.S.S.R.

[73] Assignee: Spetsialnoe Konstruktorskoe Bjuro "Transprogress", Moskovskaya, U.S.S.R.

[21] Appl. No.: 567,865
[22] PCT Filed: Apr. 21, 1982
[86] PCT No.: PCT/SU82/00014
  § 371 Date: Dec. 8, 1983
  § 102(e) Date: Dec. 8, 1983
[87] PCT Pub. No.: WO83/03812
  PCT Pub. Date: Nov. 10, 1983

[51] Int. Cl.[4] .............................................. F16L 55/00
[52] U.S. Cl. ...................................... 285/9.2; 285/420
[58] Field of Search ................................ 285/9 R, 420

[56] References Cited

U.S. PATENT DOCUMENTS

| | | | |
|---|---|---|---|
| 2,062,806 | 12/1936 | Casler | 285/9 R X |
| 3,154,326 | 10/1964 | Anding | 285/9 R |
| 3,233,549 | 2/1966 | Howe | 285/9 R X |
| 3,442,535 | 5/1969 | Frohlich | 285/420 X |
| 3,473,828 | 10/1969 | Pearson | 285/9 R |
| 3,606,389 | 9/1971 | Munton et al. | 285/9 R |
| 3,817,490 | 6/1974 | Deeg | 285/9 R X |
| 4,130,463 | 12/1978 | Klavir | 285/9 R X |

FOREIGN PATENT DOCUMENTS

| | | |
|---|---|---|
| 2617615 | 11/1976 | Fed. Rep. of Germany . |
| 624054 | 7/1978 | U.S.S.R. . |
| 893748 | 12/1981 | U.S.S.R. . |

Primary Examiner—Thomas F. Callaghan
Attorney, Agent, or Firm—Burgess, Ryan & Wayne

[57] ABSTRACT

A device for sealing the detachable joints of tubing elements in pneumatic transport facilities comprises two flanges one of which is rigidly affixed on one of the tubing elements, while the other flange (2) is mounted with a clearance (a) on the other tubing element (4), is kinematically coupled with a mechanical actuator (5) so as to be traversed lengthwise the other tubing element (4) and has a contrivance to hermetically seal up the joint between said other flange (2) and said other tubing element. The kinematic coupling of the other flange (2) with the mechanical actuator (5) is effected through a frame (6) mounted with a possibility of oscillating within the amount of the aforementioned clearance about pivot pins (11) located outside the outline of the other flange (2). The other flange (2) is mounted on the frame (6) through two hinge joints whose pivot pins (14) are situated on the opposite sides of the flange in a plane passing through the geometric axis of the tubing element (4).

2 Claims, 7 Drawing Figures

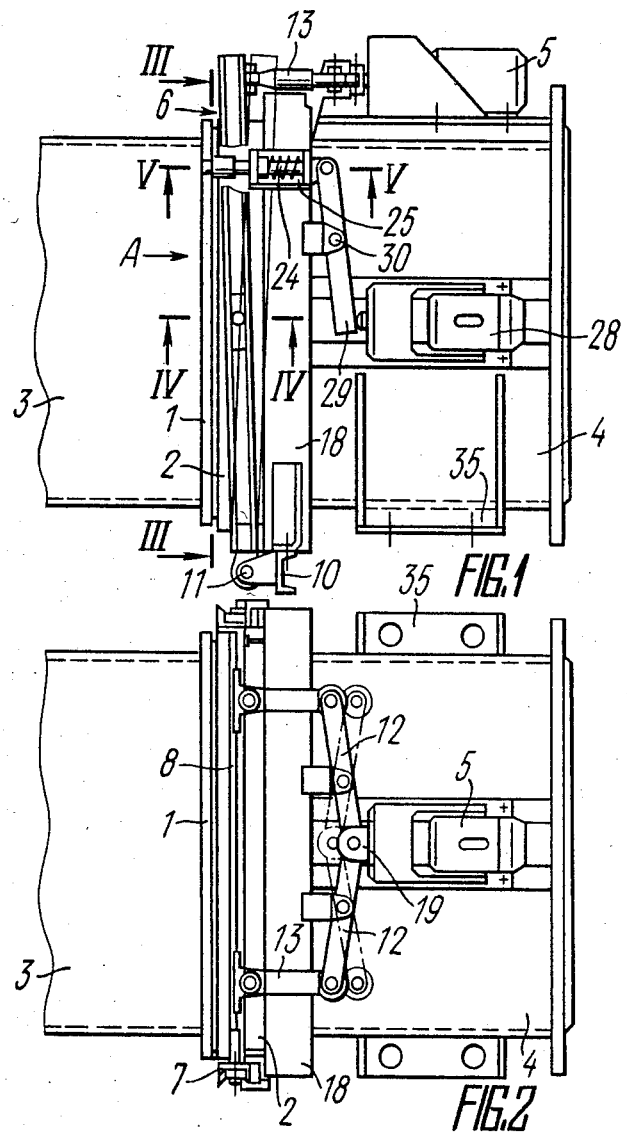

DEVICE FOR SEALING THE DETACHABLE JOINTS OF TUBING ELEMENTS IN PNEUMATIC TRANSPORT FACILITIES

TECHNICAL FIELD

This invention relates generally to pneumatic transport and more particularly to devices for sealing the detachable joints of tubing elements used in pneumatic transport facilities.

BACKGROUND ART

Known in the present state of the art are devices for sealing the joints of tubing elements used in pneumatic transport facilities, comprising two flanges of which one flange is rigidly secured on one of the tubing elements and the other flange is mounted on the other tubing element with a clearance and is kinematically associated with a mechanical actuator so as to be traversed lengthwise the other tubing element. The device is also provided with a contrivance to hermetically seal up the joint between the other flange and the other tubing element.

The other flange is so mounted on the other tubing element as to traverse strictly axially from a power cylinder kinematically associated therewith through a linkage or rodding (cf., e.g., USSR Inventor's Certificate No. 893,748 published in the "Bulletin of discoveries, inventions, industrial designs and trade marks", No. 48 of 1981).

To attain reliable operation of a pneumatic transport facility one should provide a high degree of hermetic tightness of every detachable joint. This is attainable in the aforedescribed device only due to high-precision perfect manufacture of all the components involved. However, since this device is to be applied in relatively large-bore tubings, such a manufacture of the aforesaid components substantially raises the cost of the device for sealing the detachable joints and hence the arrangement as a whole.

DISCLOSURE OF THE INVENTION

The invention is aimed at the provision of a device for sealing the detachable joints of tubing elements used in pneumatic transport facilities, wherein the kinematic association of the other flange with the mechanical actuator would make it possible to render the requirements imposed upon the manufacturing accuracy of the device components less rigorous without affecting the reliability of sealing.

The principal object of the invention is attained due to the fact that in a device for sealing the joint of tubing elements in pneumatic transport facilities, comprising two flanges of which one flange is rigidly secured on one of the tubing elements and the other flange is mounted with some clearance on the other tubing element, is kinematically associated with a mechanical actuator so as to be traversed lengthwise the other tubing element and has a contrivance to hermetically seal the joint between said other flange and said other tubing element, according to the invention, the kinematic association of the other flange with the mechanical actuator is carried out through a frame mounted with a possibility of oscillating within the aforementioned clearance about at least one pivot point which is situated outside the outline of the other flange which is mounted on said frame through two hinge joints whose pivot pins are located on the opposite sides of the flange in a plane passing through the geometric axis of the tubing element.

The device of the invention is expedient to have a retainer or lock shaped as a rod provided on the other flange and kinematically associated with its own mechanical actuator. It is also expedient that the flange rigidly secured on one of the tubing elements would have a respective hole to receive said rod.

Such a locking of the flanges in the device is the simplest one from construction viewpoint and is most reliable in operation.

The device for sealing the detachable joint of tubing elements in pneumatic transport facilities, according to the invention, does not involve high manufacturing accuracy, and is reliable in operation since one of the flanges making up the joint is capable of self-aligning with respect to the other flange.

The device of the invention is applicable in pneumatic transport facilities for hermetically sealing practically every detachable joint therein, for instance, in switch-over arrangements, end gates, etc.

BRIEF DESCRIPTION OF THE DRAWINGS

Given below is a detailed description of a specific embodiment of a device for sealing the detachable joints of tubing elements in pneumatic transport facilities represented by way of example with reference to the accompanying drawings, wherein:

FIG. 1 is a general side view of a device for sealing the detachable joints of tubing elements in pneumatic transport facilities, in accordance with the invention;

FIG. 2 is a general plan view of FIG. 1;

BEST MODE OF CARRYING OUT THE INVENTION

Figure 3:
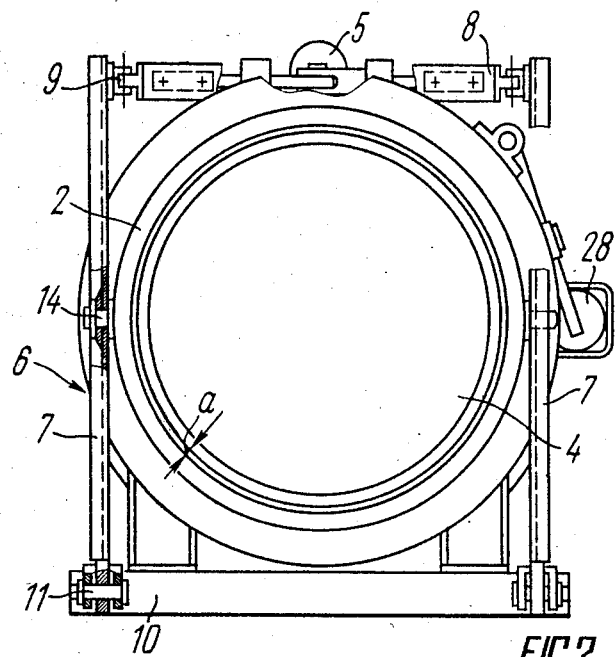
FIG. 3 is a fragmentarily cutaway view facing the arrow A in FIG. 1 to show the other tubing element with the other flange.

The device for sealing the detachable joints of tubing elements in pneumatic transport facilities comprises two flanges (FIGS. 1 and 2). The flange 1 is rigidly secured on one of the elements of a tubing 3, while the flange 2 is situated on the other element 4 of the tubing and is kinematically associated with a mechanical actuator 5 (FIG. 1) which is affixed to the other element 4 of the tubing. The kinematic linkage comprises a frame 6 (FIG. 3) having two uprights 7 connected at the top to a crosspiece 8 through hinges 9 having a vertical pivot pin. Each of the uprights 7 with its bottom portion situated outside the outline of the flange 2, is held to a stationary fixed base 10 through cylindrical hinges having a horizontal pivot pin 11. The frame 6 is connected, through a system of hinge-joined links 12, 13 (FIG. 2), to the mechanical actuator 5.

Figure 4:
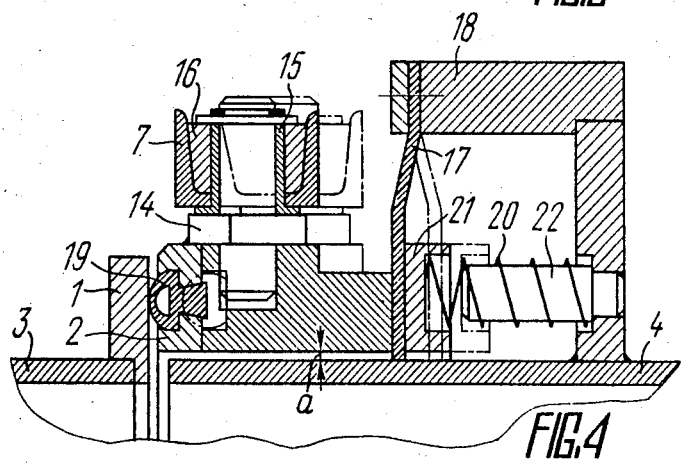
FIG. 4 is a scaled-up view of a section taken along the line IV—IV in FIG. 1.

The flange 2 is mounted on the frame 6 by means of two cylindrical hinges whose pivot pins 14 are located on the opposite sides of the flange 2 in a plane passing through the geometric axis of the tubing parallel to the pivot pins 11. Each of the pivot pins 14 is rigidly affixed to the flange 2 and is rotatably mounted on the upright 7 through a sleeve 15 (FIG. 4) and a boss 16. The flange 2 is positioned on the other element 4 with a clearance 'a' and has a contrivance 17 for hermetically sealing the flange 2 with respect to the tubing element 4. The contrivance is in effect a sealing cup indicated at the same Ref. No. 17. The cup is made from an elastic material and is a hermetically tight fit on the flange 2 and peripherally, in a holder 18 which is rigidly secured on the other element 4 of the tubing.

An annular slot is made in the flange 2 on its surface facing the flange 1, said slot being adapted for accommodating a gasket 19 made of an elastic material.

To retain the flanges 1 and 2 mated springs 20 are provided, which are equispaced circumferentially. Each of the springs 20 with one end rests against a member 21 which adjoins the cup 17, while the other end of each spring rests against the holder 18. Each of the springs 20 is set on a rod 22 which is affixed to the holder 18 to serve as a guide for the spring 20.

Figure 5:
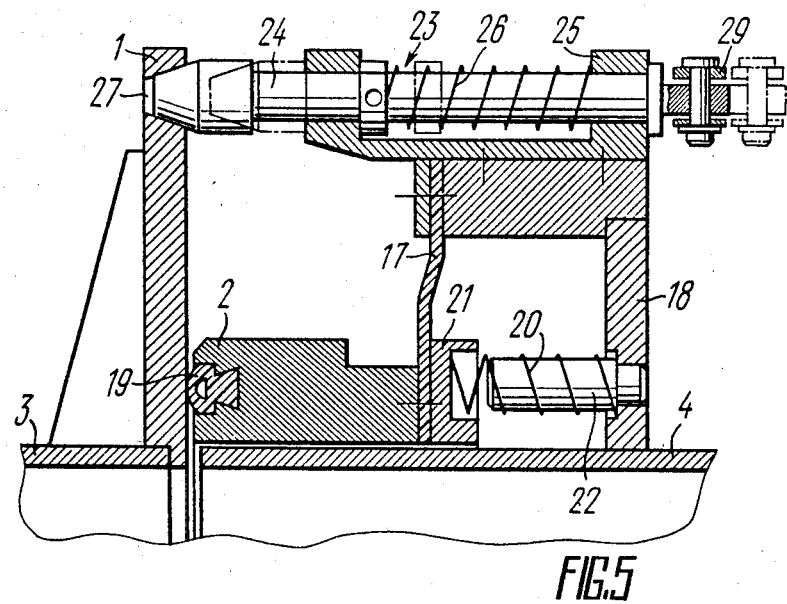
FIG. 5 is a scaled-up view of a section taken along the line V—V in FIG. 1.

In order that all the components of the device would remain in a preset position after the flange 2 has self-aligned with respect to the flange 1 (especially in constructions exposed to heavy vibrations or dynamic loads, for example, in switch-over arrangements or straight-through lock gates when passing heavy containers (exceeding one tonne in mass), a retainer 23 (FIG. 5) is provided, comprising a locking pin 24 mounted on a bracket 25 which is affixed to the holder 18, and a spring 26.

The spring 26 is precompressed with one end connected to the locking pin 24, while the other end of the spring 26 rests against the bracket 25. The flange 1 has a hole 27 (FIG. 5) to receive the end of the locking pin 24. With the flanges 1 and 2 joined together the locking pin 24 with its end engages the hole 27 and is retained there by the spring 26. To disengage and withdraw the locking pin 24 from the hole 27 when disjoining the flanges 1 and 2, a mechanical actuator 28 (FIG. 1) is provided, which actuates the locking pin 24 through a lever 29 pivotable about a pin 30.

Whenever necessary a greater number of the retainers may be provided.

Figure 6:
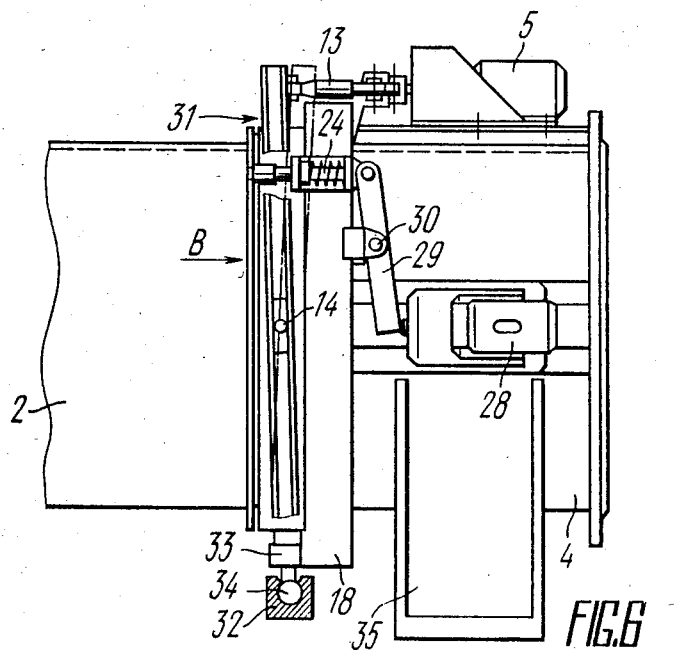
FIG. 6 is a side view of a device for sealing the detachable joints of tubing elements in pneumatic transport facilities, showing a frame that pivots on a ball-and-socket joint.
Figure 7:
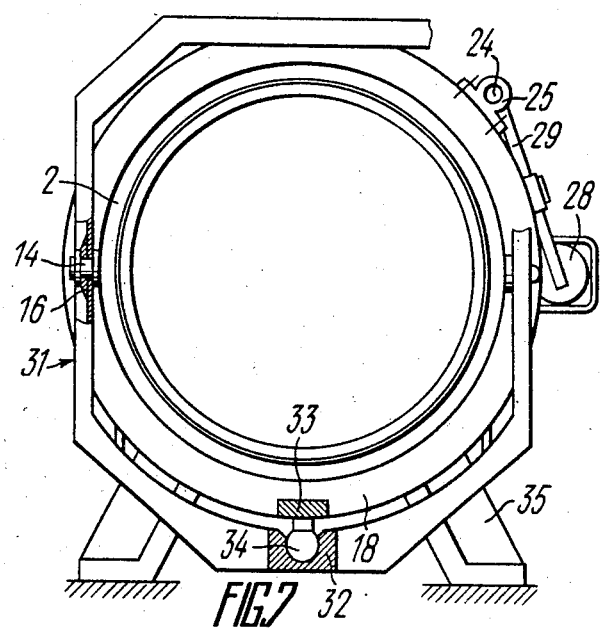
FIG. 7 is the same viewed along the arrow B in FIG. 6, with one tubing element removed.

The invention can be carried into effect in an alternative constructional embodiment illustrated in FIGS. 6 and 7.

In accordance with this embodiment a frame 31 (FIGS. 6, 7) is of a closed construction and has in its bottom portion a boss 32 with a spherical depression. The holder 18 has a bracket 33 with a spherical footstep 34 accommodated in said depression to establish a ball-and-socket joint.

In this constructional arrangement the frame 31 is linked to the mechanical actuator 5 and to the flange 2 in the same manner as described hereinabove.

The other element 4 of the tubing is situated on supporting brackets 35.

The device for sealing the detachable joints of tubing elements in pneumatic transport facilities described hereinbefore, operates as follows.

The initial position of the device is the one in which the detachable joint is sealed up. The mechanical actuator 5 is disengaged and the other flange 2 is pressed against the flange 1 by the springs 20. The gasket 19 is strained to hermetically seal the joint. The clearance 'a' between the other flange 2 and the other element 4 of the tubing is sealed up by the cup 17 which is a hermetically tight fit on the and peripherally, in the holder 18.

When the other flange 2 is pressed against the flange 1 the frame 6 linked to the flange 2 through the cylindrical hinges having the pivot pin 14, swivels about the horizontal pivot pins 11 towards the flange 1 (i.e., counterclockwise within the limits of the clearance 'a' defined between the flange 2 and the other element 4 of the tubing) so as to assume the leftmost position (as seen in the drawing). As a result, the flange 2 swivels about the pivot pins 14 with respect to the frame 6 and also about the pivot pins 11 along with the frame 6, as well as in a horizontal plane about the hinge joints 9 with the vertical pivot pin so as to self-align with respect to the flange 1.

Then in order to retain all the components of the device in a preset position after the flange 2 has self-aligned with the flange 1 and the joint between the elements 3 and 4 of the tubing has been hermetically sealed, the mechanical actuator 28 is disengaged. As a result, the lever 29 released from the action of the mechanical actuator 28, is turned counterclockwise about the pivot pin 30 under the action of the spring 26. This spring, while tending to release, urges the locking pin 24 of the retainer 23 to move axially to the left (as seen in the drawing), whereby the end of the locking pin 24 engages the hole 27.

When it becomes necessary to unseal the joint the mechanical actuator 28 of the retainer 23 is engaged to act upon the lever 29. As a result, the lever 29 turns clockwise about the pivot pin 30 and, while overcoming the tension developed by the spring 26, urges the locking pin 24 to move axially to the right (as seen in the drawing), thus disengaging it from the hole 27 in the flange 1. Thus, the device is unlocked.

Further is engaged the mechanical actuator 5 which acts through a system of links 12, 13 upon the frame 6. As a result, the frame, while acting against the force pressing the flange 2 against the flange 1 and developed by the springs 20, swivels clockwise about the horizontal pivot pins 11 within the limits of the clearance 'a' defined between the flange 2 and the other element 4 of the tubing so as to assume the rightmost position (shown with light lines in the drawing).

As a result, the flange 2 connected to the frame 6 through the cylindrical hinges with the pivot pins 14, turns clockwise along with the frame 6 and is withdrawn from the flange 1 until the rods 22 rest against the member 21 which adjoins the cup 17 and the flange 2. Thus, the joint is unsealed.

It is practicable to retain the flanges 1 and 2 joined together not only by virtue of the springs 20 but also by the mechanical actuator 5, or by any heretofore-known means suitable for the purpose.

INDUSTRIAL APPLICABILITY

The invention can find most utility when applied for sealing up switch-over arrangements, end gates and similar components of pneumatic transport facilities.

We claim:

1. A device for sealing detachable joints of two tubing elements in a pneumatic transport facility, said device comprising:
   two flanges,
   one of the flanges being rigidly affixed on one of the tubing elements,
   the other flange being mounted with a clearance on the other tubing element and connected with a mechanical actuator by a kinematic coupling so as to be traversed lengthwise the other tubing element, said other flange including means for hermetically sealing a joint between said other flange and said other tubing element, characterized in that:

the kinematic coupling which connects the other flange with the mechanical actuator includes a frame which is pivotally mounted through an angle corresponding to the amount of the aforementioned clearance about at least one pivot point situated outside the other flange, and the other flange is mounted on the frame through two hinge joints including pivot pins which are located on opposite sides of the other flange in a plane passing through the geometric axis of the other tubing element.

2. A device as claimed in claim 1, further characterized by a retainer including a locking pin mounted on the other tubing element and kinematically coupled with another mechanical actuator, and the one flange rigidly affixed on the one tubing element has a respective hole for the locking pin to engage.

* * * * *